United States Patent
Jacobs et al.

(10) Patent No.: US 10,592,664 B2
(45) Date of Patent: Mar. 17, 2020

(54) CONTAINER APPLICATION SECURITY AND PROTECTION

(71) Applicant: Cisco Technology, Inc., San Jose, CA (US)

(72) Inventors: William E. Jacobs, Beaverton, OR (US); Rafael Mantilla Montalvo, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 157 days.

(21) Appl. No.: 15/422,625

(22) Filed: Feb. 2, 2017

(65) Prior Publication Data
US 2018/0218149 A1 Aug. 2, 2018

(51) Int. Cl.
*G06F 21/54* (2013.01)
*G06F 21/56* (2013.01)
*G06F 21/52* (2013.01)

(52) U.S. Cl.
CPC .............. *G06F 21/54* (2013.01); *G06F 21/52* (2013.01); *G06F 21/56* (2013.01); *G06F 2221/033* (2013.01)

(58) Field of Classification Search
CPC ... H04L 63/14; H04L 63/20; G06F 2221/033; G06F 21/51–54; G06F 21/56; G06F 21/566
See application file for complete search history.

(56) References Cited

U.S. PATENT DOCUMENTS

| 7,093,239 | B1 * | 8/2006 | van der Made ...... G06F 21/562 714/38.13 |
| 8,468,345 | B2 | 6/2013 | Auradkar et al. |
| 8,843,997 | B1 | 9/2014 | Hare |
| 8,966,623 | B2 * | 2/2015 | Horovitz ............. G06F 9/45533 726/22 |
| 8,984,478 | B2 | 3/2015 | Epstein |
| 9,116,768 | B1 | 8/2015 | Sawhney et al. |
| 9,117,080 | B2 * | 8/2015 | Lukacs ................... G06F 21/53 |
| 9,201,704 | B2 * | 12/2015 | Chang ................. G06F 9/45558 |

(Continued)

OTHER PUBLICATIONS

Kerner, "Aqua Launches Container Security Platform," eWeek, http://www.eweek.com/print/security/aqua-launches-container-security-platform.html, May 19, 2016, 2 pages.

(Continued)

*Primary Examiner* — Linglan E Edwards
(74) *Attorney, Agent, or Firm* — Edell, Shapiro & Finnan, LLC (57) ABSTRACT

A plurality of pages of code executing via a container host operating system are monitored. The plurality of pages of code include pages of code from a plurality of container applications configured to utilize the container host operating system. A determination is made that a page of code of the plurality of pages of code violates a security policy configured to apply security within the container host operating system. A container application of the plurality of container applications is identified as a source of the page of code of the plurality of pages of code. The security policy is applied to the container application of the plurality of container applications in response to identifying the container application of the plurality of container applications as the source of the page of code.

20 Claims, 6 Drawing Sheets

(56) References Cited

U.S. PATENT DOCUMENTS

| | | |
|---|---|---|
| 9,223,962 B1 | 12/2015 | Kashyap et al. |
| 9,276,963 B2 | 3/2016 | Viswanathan et al. |
| 9,323,931 B2* | 4/2016 | Lukacs ................. G06F 21/566 |
| 9,332,028 B2 | 5/2016 | Xaypanya et al. |
| 9,392,010 B2 | 7/2016 | Friedman et al. |
| 9,459,901 B2* | 10/2016 | Jung ................... G06F 9/45558 |
| 9,609,020 B2* | 3/2017 | White ..................... H04L 63/20 |
| 2005/0278790 A1* | 12/2005 | Birk ........................ G06F 21/54 |
| | | 726/26 |
| 2014/0189777 A1 | 7/2014 | Viswanathan et al. |
| 2015/0101049 A1* | 4/2015 | Lukacs ................. G06F 21/566 |
| | | 726/23 |
| 2015/0379287 A1 | 12/2015 | Mathur et al. |
| 2016/0274928 A1 | 9/2016 | Linton et al. |
| 2016/0342786 A1 | 11/2016 | Gerebe |
| 2016/0359622 A1* | 12/2016 | Bunch ................... H04L 9/0822 |
| 2017/0078216 A1* | 3/2017 | Adolph ............... H04L 12/4641 |
| 2017/0149804 A1* | 5/2017 | Kolbitsch ........... H04L 63/1416 |
| 2017/0353496 A1* | 12/2017 | Pai .......................... G06F 21/53 |

OTHER PUBLICATIONS

Yegulalp, "Docker, Twistlock, CoreOS, and the state of container security," InfoWorld, http://www.infoworld.com/article/3012180/application-virtualization/docker-twistlock-coreos-container-security.html, Dec. 7, 2015, 3 pages.

Oliver, "Twistlock and the Future of Container Security," The New Stack, http://thenewstack.io/twistlock-future-container-security/, Oct. 23, 2015, 5 pages.

* cited by examiner

CONTAINER APPLICATION SECURITY AND PROTECTION

TECHNICAL FIELD

The present disclosure relates to container application host environments, and in particular, providing security within such environments.

BACKGROUND

Container applications are a type of computer application that leverages a form of virtualization. Unlike virtual machines, in which both a guest operating system kernel and the user space are virtualized on a per-virtual machine basis, container applications utilize separate user spaces with a shared host operating system kernel space.

Container applications are often used as modular, open source pieces that may be combined and shared to build an application. For example, container applications for performing specific or common tasks may be created and then shared in repositories so that unrelated entities may take and incorporate the container applications into their own computing environments.

DESCRIPTION OF EXAMPLE EMBODIMENTS

Overview

In accordance with one embodiment, a plurality of pages of code executing via a container host operating system are monitored. The plurality of pages of code include pages of code from a plurality of container applications configured to utilize the container host operating system. A determination is made that a page of code of the plurality of pages of code violates a security policy configured to apply security within the container host operating system. A container application of the plurality of container applications is identified as a source of the page of code of the plurality of pages of code. The security policy is applied to the container application of the plurality of container applications in response to identifying the container application of the plurality of container applications as the source of the page of code.

Example Embodiments

Figure 1:
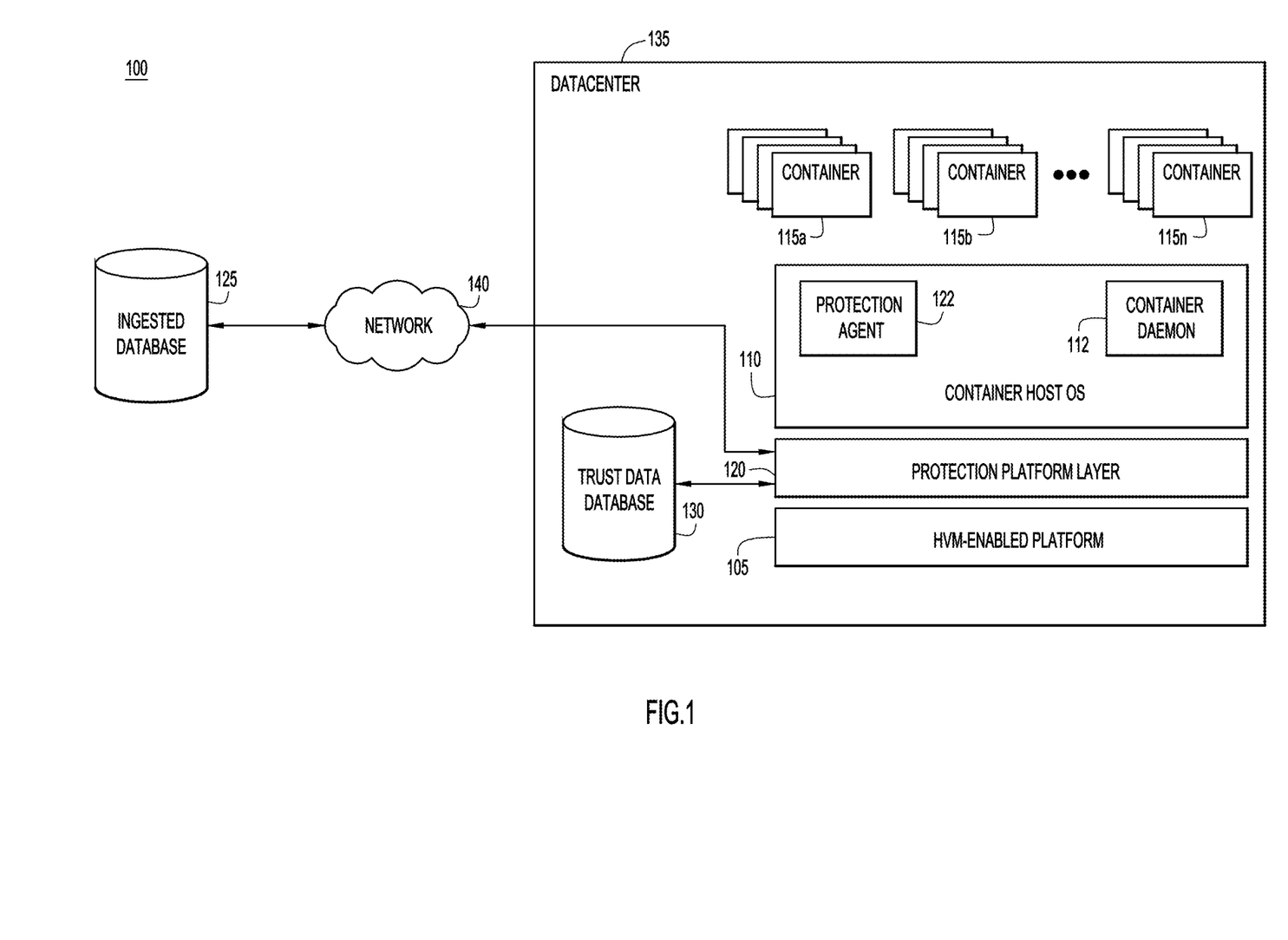
FIG. 1 is a block diagram illustrating a first example container application hosting environment configured to provide application security and protection, according to an example embodiment.

With reference now made to FIG. 1, depicted therein is an environment 100 configured to provide security in a container application environment. Though a nascent technology, there are very large expectations that container application environments and technologies may replace monolithic applications. For example, one advantage of containerized applications is that an application may be divided into many small, portable, manageable, easily launched, easily stopped pieces. There are already repositories where one may find existing container applications—either free or for a fee—that provide some service or micro-service needed to fulfill an application. Other container applications may be developed in-house. Regardless of the source of the container application, it may be reasonably expected that container applications from multiple sources may be employed together in combinations to perform business tasks. However, not all of these container applications may be trusted. Some container applications may contain intentionally malicious code, while others may, through poor coding techniques or sloppy security design, permit or enable misbehavior within a container application platform. Many container host operating systems may be running multiple container applications from unknown sources, for un-vetted guests, and for various reasons. Such environments present a security risk. Code potentially containing malware, living in kernel space proximity to other container applications, presents the risk of one container application affecting others in negative ways, and/or affecting the container host operating system itself. The techniques described herein provide security to container host platforms that, when implemented in example embodiments, may ameliorate some or all of these concerns. Furthermore, the techniques described herein may be used to protect other types of applications, including non-container applications and/or the infrastructures that establishes environment 100.

The environment 100 of FIG. 1 includes a Hardware Assisted Virtual Machine (HVM) enabled platform 105. Though, other computing devices and platforms are within the scope of the present disclosure. Running on HVM-enabled platform 105 is container host operating system (OS) 110. Container host OS 110 serves as the operating system for container applications 115*a-n*. The combination of container host OS 110 and container applications 115*a-n* are a form of operating-system level virtualization. Specifically, container host OS 110 provides a common operating system kernel utilized by each of container applications 115*a-n*, but each of container applications 115*a-n* executes in its own isolated user-space instance. This environment differs from virtual machines, in which the virtualization includes a separate kernel space for each application, and non-virtualized operating systems in which both the user space and the kernel space are shared by different applications.

In order to facilitate the execution of the container applications 115*a-n*, container host OS 110 includes a container daemon module 112. The container daemon 112 may be embodied, for example, as the Docker engine used by Linux operating systems. Container daemon 112 provides the functionality necessary to execute container applications 115*a-n* within container host OS 110. For example, container daemon 112 allows container host OS 110 to load, stop, pause, kill (i.e., abort execution of), and perform other functions with regard to container applications 115*a-n*.

Also included in HVM enabled platform 105 is protection platform layer 120 which is configured to provide security within environment 100, as will be described in greater detail below with reference to FIGS. 2-5. In general protection platform layer 120 guards container host OS 110, HVM-enabled platform 105 and container applications 115a-n in real-time and enables enforcement of trust-based policies on a code page level basis, thereby enabling enforcement of trust-based policies on an application-by-application basis, including on a container-by-container basis. The techniques described herein go beyond conventional reputation-based security systems in multiple ways. For example, the techniques described herein include active monitoring of all code pages executing via container host OS 110 in real-time and at an intimate level (e.g., each page of every process on container host OS 110 is monitored). The techniques described herein may also take real-time action against even previously unknown application issues, in addition to acting based upon "reputation" or "trust" scores. Furthermore, the techniques described herein may be utilized to build a deeper container trust metadata reservoir because of its deep inspection ability of every process executing on container host OS 110.

As illustrated in FIG. 1, protection platform layer 120 may include a protection agent module or API 122 configured to execute within container host OS 110. The protection agent 122 allows protection platform layer 120 to leverage the functionality of container host OS 110 and container daemon 112. Though, as described in more detail below with reference to FIG. 3, protection platform layer 120 may access container host OS 110 and container daemon 112 through other means, such as creating its own code pages within container host OS 110 that execute commands within container host OS 110. Furthermore, because protection platform layer 120 monitors code pages by executing its own code pages, protection platform layer 120 may also monitor non-container application code pages, thereby providing security to non-container applications.

There may be particular benefits to not using a module executing within container host OS 110 to provide container protection. By omitting protection agent module 122, application protection may be achieved in a way that the protection platform layer 120 is immune from attacks or malware executing on container host OS 110 or within some other component of the container host platform layer. In other words, by performing all monitoring and decision-making in the protection platform layer 120 outside of the domain of the container host OS 110, the protection is provided in a protected and isolated domain.

Also included in environment 100 are "ingested" database 125 and trust data database 130. Both of these databases contain data that may be used by protection platform layer 120 in order to provide security within environment 100. "Ingested" database 125 is so named because it contains data identifying known code pages that have been previously ingested by protection platform layer 120. According to other example embodiments, ingestion information may be obtained in a separate, standalone ingestion process executed in advance of the current session to which protection is being applied. For example, the data identifying the known code pages may have been originally created within environment 100 by protection platform layer 120, or it may be generated by another device or system external to environment 100, and provided to "ingested" database 125 as a service. The ingestion information may also include ingestion information for code pages associated with other non-container application types, and may even include ingestion information for code pages associated container host OS 110.

As part of the ingestion process, whether specific to the current session or provided as part of a separate stand-along ingestion process, known and/or whitelisted code pages may be fingerprinted by protection platform layer 120. This fingerprinting may then be stored in ingested database 125. Accordingly, when protection platform layer 120 evaluates a code page executing via container host OS 110, protection platform layer 120 may compare the executing code with the data contained in ingested database 125. If the executing code page matches a fingerprint in ingested database 125, it may be determined by protection platform layer 120 that the executing code page is, for example, a whitelisted code page that may be permitted to continue to execute within container host OS 110. On the other hand, if the executing code page does not match one of the entries in ingested database 125, protection platform layer 120 may determine that the code page should be, for example, monitored closely or killed as it is a code page not previously whitelisted by protection platform layer 120.

A code page may not have a corresponding fingerprint in ingested database 125 even if the code page is associated with a previously ingested application. Viruses, malware, rootkits, or other malicious actors may inject new code into an existing application or modify the code pages of existing applications. Accordingly, comparison of the code pages as they execute to the contents of ingested database 125 provides important security features.

Trust data database 130 contains information indicating a trust or reputation level for a particular application. Unlike ingested database 125, trust data database 130 may contain trust or reputation data for applications that have not been ingested or executed via container host OS 110. The data in trust data database 130 may also include additional information or metadata about applications, including provenance information, author information, where the application was first found (e.g., in a container hub), details about the code contained in the application, common vulnerability and exposure (CVE) information, and other, possibly proprietary, metadata.

Before a previously unknown or undigested application is allowed to execute within container host OS 110, protection platform layer 120 may access the data contained within trust data database 130 to determine whether or not the database contains a trust or reputation score for the code page. Based on the score, protection platform layer 120 may decide to not execute the code, to allow the code to execute but with monitoring, to allow the code to execute freely, or take other action according to the policies implemented by protection platform layer 120. As will be discussed in more detail with reference to FIG. 4 below, protection platform layer 120 may be configured to update the contents of trust data database 130 based upon the results of the code page monitoring provided by protection platform layer 120.

As illustrated in FIG. 1, HVM enabled platform 105 may be arranged within a datacenter 135. According to the specific example of FIG. 1, trust data database 130 is also local to datacenter 135, while ingested database 125 is outside of datacenter 125, and communicates with protection platform layer 120 via network 140. According to other example embodiments, ingested database 125 may be local to datacenter 135 or contained within the same physical apparatus as HVM-enabled platform 105. Similarly, trust data database 130 may be remote from HVM enabled platform 105, an example of which is explained in more detail below with reference FIG. 4.

Additionally, the application protection described herein may be deployed within an enterprise, within a private container hub or hubs, or globally, with any and all public container hubs within its scope. The protection system described herein may be implemented in combination, either layered, cascaded or in other ways, with other protection systems not illustrated in FIG. 1.

Figure 2:
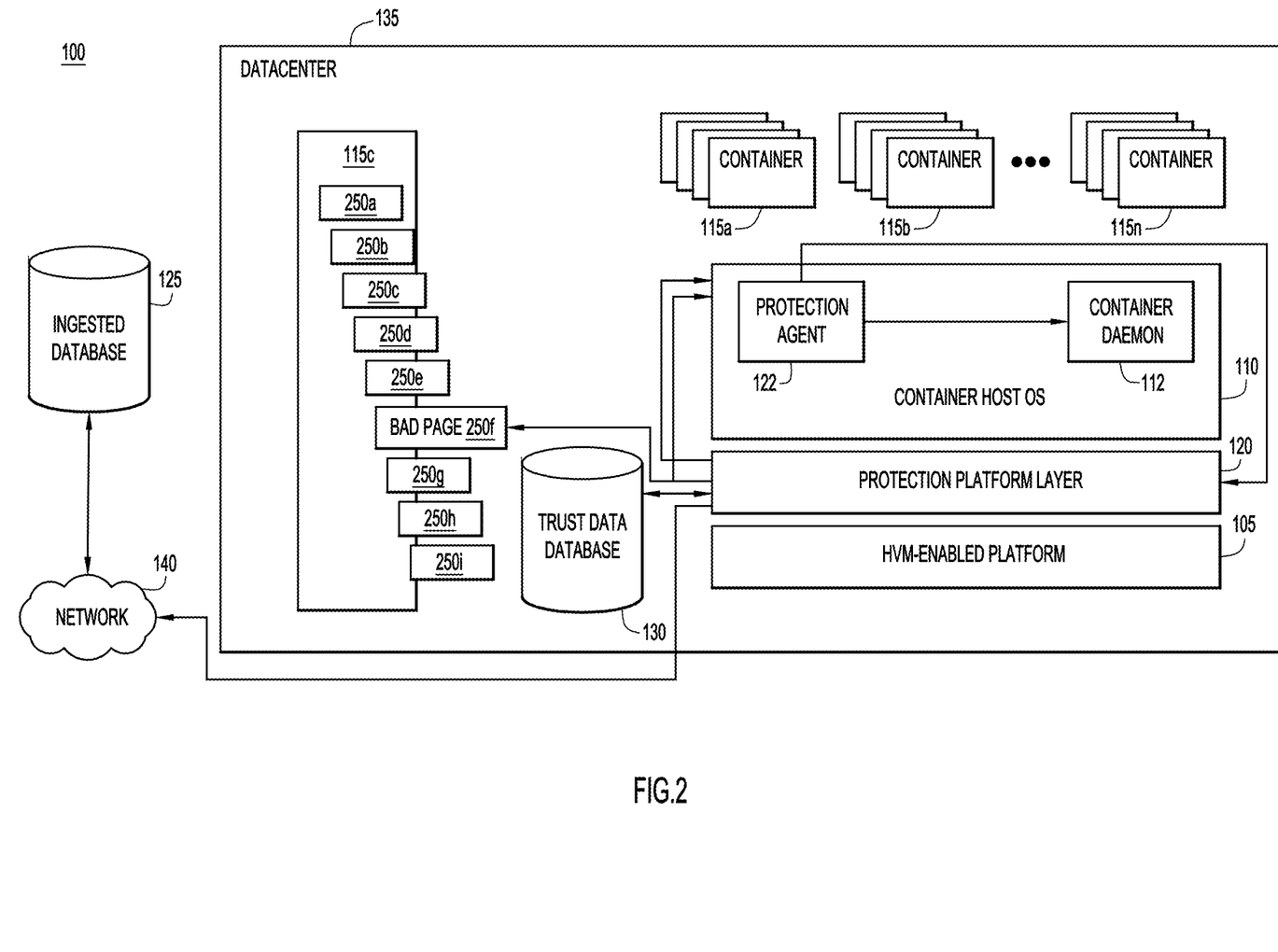
FIG. 2 is a block diagram illustrating a second example container application hosting environment configured to provide application security and protection, according to an example embodiment.

With reference now made to FIG. 2, depicted therein is a view of environment 100 of FIG. 1, but with a more detailed view of the code pages associated with container applications 115*a-n*. Immediately upon the launch of container host OS 110, protection platform layer 120 is monitoring code pages. Protection platform layer 120 may be provided with a set of fingerprints for code pages associated with container host OS 110 itself. If protection platform layer 120 sees "bad" code (e.g., unrecognized code or code that has been compromised) executed via container host OS 110, it may immediately take action to protect HVM enabled platform 105 from the unrecognized code in container host OS 110. Upon launch of the container daemon 112, protection platform layer may perform the assessment and protection on the code pages associated with container daemon 112. As container applications 115*a-n* are launched (or more accurately, as images of container applications 115*a-n* are launched), protection platform layer 120 actively monitors every code page associated with container applications 115*a-n*. Furthermore, as non-container applications are launched, protection platform layer 120 may actively monitor code pages associated with these non-container applications.

For example, container application 115*c* contains code pages 250*a-i*, all of which are executing within container host OS 110, and all of which are being actively monitored by protection platform layer 120. This monitoring also includes all code pages associated with container host OS 110 and container daemon 112. During the monitoring, the actual code within each code page is watched to ensure that what is being executed is "meant" to be there. Said differently, the monitoring provided by protection platform layer 120 establishes a code invariant protection upon the entire payload of the code page, meaning that only code that is expected to be running on the platform within its payload is allowed to run. This protection is carried out such that any attempt to execute code from a code page results in a trap which causes a byte-by-byte page examination by protection platform layer 110.

Once trapped, the executing code is fingerprinted. This fingerprinted code may then be compared with the contents of ingested database 125. This fingerprinting may take place based upon a predetermined amount of code. For example, 8-byte code sequences or "slices" may be taken from the executing code pages. A hash or mask signature may be generated for each of these slices. These hashed or masked slices may also include an identifier of the page from which the hashed or masked valued was taken. The hashed or masked value may then be compared with the contents of ingested database 125 using a fast look-up operation. Code that is "meant" to be executing within container host OS 110 may be found in ingested database 125, and code that is not "meant" to be executing may not have a corresponding value stored in ingested database 125. If code is found that is not "meant" to be executing in container host OS 110 (i.e., code that is not intended or not expected to be executing within container host OS 110 according to security policies implemented by protection platform layer 120), further steps may be taken by protection platform layer 120. According to other examples, code previously determined to be "bad" may be identified by a fingerprint within ingested database 125. If the fingerprint associated with the executing code matches the fingerprint of a known "bad" piece of code, further steps may be taken by protection platform layer 120

According to the example of FIG. 2, all of the code pages associated with container applications 115*a-n* are monitored by protection platform layer 120, including code pages 250*a-i* from container application 115*c*. While code pages 250*a-i* are shown as being associated with container application 115*c*, during their execution it may not be immediately known to protection platform layer 120 which of container applications 115*a-n* the code pages have come from. This is because the code pages are associated with a process identifier (PID). In the case of container applications, all of the code pages associated with the different container applications 115*a-n* may share the PID for container daemon 112. Protection platform layer 120 fingerprints the code associated with code pages 250*a-i* (e.g., hashing or masking the code in 8-byte segments or slices) and compares the fingerprints to the contents of ingested database 125. As a result of the monitoring, protection platform layer 120 determines that code page 250*f* is not "meant" to be executed via container host OS 110. In other words, there is no entry in ingested database 125 that matches one or more of the fingerprints associated with code page 250*f*. To refer to it more simply, code page 250*f* is identified as a "bad page."

Once code page 250*f* is identified as a bad page, protection platform layer 120 takes steps to address the page based on policies encoded in protection platform layer 120. According to the example of FIG. 2, protection platform layer 120 may take steps to kill the application associated with bade code page 250*f*. For non-container applications, the PID associated with the code page may be used to identify the application associated with bad code page 250*f*. According to the present example, code page 250*f* is associated with the PID for container daemon 112. Accordingly, additional steps may be necessary to identify the application associated with code page 250*f*.

Specifically, protection platform layer 120 queries the container daemon 112 for a container identifier associated with bad page 250*f*. Protection platform layer 120 may perform this querying in multiple ways. In example embodiments in which protection agent 122 is executing within container host OS 110, protection agent 122 may execute the commands that query container daemon 112 to identify the container associated with bad page 250*f*. According to other example embodiments in which there is no protection agent 122 executing within container host OS 110, alternative ways of querying container daemon 112 for the container identifier may be utilized. For example, protection platform layer 120 may generate its own code page or pages that may be executed within container host OS 110. The executable code contained within the code page or pages may query container daemon 112 for the container associated with bad page 250*f*. A more detailed description of this process is described below with reference to FIG. 3.

Once the application associated with bad code page 250*f* is identified, in this case container application 115*c*, protection platform layer 120 may take steps to remediate container application 115*c*. For example, if container application 115*c* has previously executed without error, protection platform layer 120 may determine that the code pages associated with container applications 115*c* have been changed. A virus, malware or rootkit may have maliciously inserted bad code page 250*f* or changed the content of bad code page 250*f*. One possible policy for protection platform layer 120 to implement is to deny any code changes. When such a policy exists in protection platform layer 120, container application 115c (or an image of container application 115c) may be killed in response to the detection of bad code page 250f.

According to other example embodiments, protection platform layer 120 may determine that the application associated with bad code page 250f, in this case container application 115c, did not have fingerprints in ingested database 125 because this was the first time container application 115c executed within container host OS 110. If it is determined that the application associated with bad code page 250f is a previously undigested application, protection platform layer 120 may query trust data database 130 to receive a trust score for container application 115c. If the trust score received from trust data database 130 is sufficiently high, container application 115c may be permitted to continue to execute within container host OS 110. On the other hand, if the trust score is too low, the policies implemented by protection platform layer 120 may require that container application 115c be killed. A trust score threshold may be set by a user or administrator in charge of environment 100. Depending on the security needs of a particular implementation, some HVM-enabled platforms may require higher or lower levels of security. Accordingly, users and/or administrators may tailor trust score thresholds to their particular needs.

In example embodiments in which a protection agent 122 is utilized, the commands to kill the image of container application 115c may be effectuated by protection agent 122. According to other example embodiments, protection platform layer 120 may generate its own code page that contains system commands to kill the image of container application 115c executing via container host OS 110, and inject this code page into container host OS 120.

Protection platform layer 120 may take additional steps to record the identification of code page 250f as a bad page, and also record the association of code page 250f with container application 115c. For example, protection platform layer 120 may update ingested database 125 with information indicating that the fingerprint or fingerprints associated with code page 250f are fingerprints of a bad code page. Due to the nature of container applications (i.e., containers may be constructed from shared pieces of code or shared code pages), bad code page 250f may appear in other container applications 115a-n, not just container application 115c. By including a fingerprint for code page 250f in ingested database 125, this fingerprint may be used to remediate this same code page in other applications as well.

Protection platform layer 120 may also update trust data database 130 with information indicating that container 115c contained a bad code page. As a result, a trust or reputation score contained in trust data database 130 for container application 115c may be changed to reflect the determination by protection platform layer 120 that container application 115c contained a bad code page.

In the example described above with reference to FIG. 2, protection platform layer 120 implements a policy that kills container 115c due to its association with bad code page 250f. Given the amount of real-time data acquired by protection platform layer 120 (i.e., via the code page level deep inspection performed by protection platform layer 120), as well as the "reputation" or "trust score" data that may be leverage from trust data database 130, a number of other protection policies or profiles may be enabled, giving more flexibility and deployment options for protection platform layer 120. One example policy may be an "allow" policy, a permissive policy in which any new/unknown page is allowed to run while also being fingerprinted for inclusion in ingested database 125. At the other extreme, a "deny" policy would prevent any new/unknown code from executing. Such a policy may be useful in cases where an attack's signature may not be known yet, or in the case of a possible insider attack. Other policies may be based on trust or reputation scores received from trust data database 130, in which a threshold is set within protection platform layer 120, and any application which does not meet the required trust threshold may be terminated. The prevention of execution is literal and real-time action, in which protection platform layer 120, using its deep inspection functionality mechanisms, kills the process on container daemon 112 and/or kills processes associated with non-container applications directly within container host OS 110.

Furthermore, even applications previously determined to be "good" (e.g., applications with high trust and/or reputation scores in trust data database 130) may be vulnerable to real-time attack via an adjacent application. Accordingly, protection platform layer 120 may implement policies to monitor such good applications in order to identify attacks on such applications from other applications executing via container host OS 110.

Figure 3:
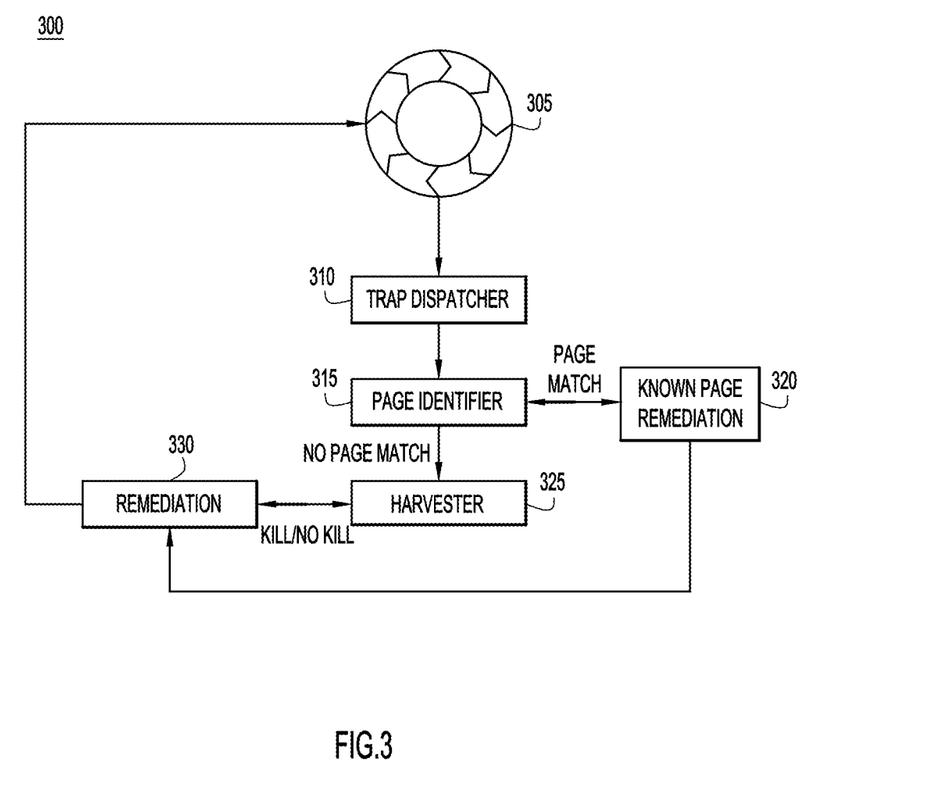
FIG. 3 is a process flow diagram illustrating the process flow for providing security and protection within a container application hosting environment, according to an example embodiment.

With reference now made to FIG. 3, depicted therein is a flowchart 300 illustrating a process flow for functions performed to provide application protection according to the techniques described herein. The operations illustrated in FIG. 3 may illustrate processes which execute outside of the container host platform, for example, within a protection platform layer as described above with reference to FIGS. 1 and 2.

In operation 305 one or more applications, including container applications, are executing in a container host environment or platform like that of environment 100 of FIGS. 1 and 2. Upon certain code executions of these applications, faults are trapped in the trap dispatcher of operation 310. According to one specific example, when a configuration or "cfg" file of a new application is executed, the code associated with this execution is trapped by trap dispatcher 310 for inspection. This trapping is not limited to just cfg files. A page violation may execute on all attempts to execute code, thereby initiating the "trap" on the executing code. When this happens, the protection platform layer receives the "trap" from the hardware. Depending on the implementation, the protection platform layer may be configured to execute faults every time code from a container application is executed, or only for a subset of predetermined executions. According to some example embodiments, traps may be established for all types of code pages, not just those associated with container applications. For example, the traps may trap code pages associated with the container host operating system itself, or code pages associated with applications other than the container applications.

Once the executed code is trapped, the code page associated with the code is identified in operation 315. Page identification operation 315 may include, for example, fingerprinting the code within the code page and comparing the fingerprints to the contents of an ingested code database, like ingested database 125 of FIGS. 1 and 2. If the code page is identified (e.g., the fingerprints associated with code page are contained within ingested database 125), further actions may be taken in operation 320. The actions taken in operation 320 may include registering the page for logging or even killing the application associated with the code page if it has previously been determined to contain malicious code.

Other actions taken with regard to known code pages may include allowing the code page to execute with or without monitoring.

If, on the other hand, the code page is not identified in operation 315, harvester operation 325 is utilized to determine the application associated with the code page. One example harvester operation may proceed as follows:

1. A process identifier (PID) is determined for the page. If the PID is associated with the container daemon (e.g., container daemon 112 of FIGS. 1 and 2), then it may be determined that the code page is associated with a container application and the PID may be insufficient to identify the specific application with which the code page is associated. The PID may be sufficient to identify non-container applications.
2. If it is determined that the code page is associated with a container application, the container host OS may be temporarily halted while the protection platform layer identifies the container application associated with the code page. The identification process described below in items "3" and "4" may only be on the order of millisecond, and therefore, the temporary halting of the host OS may be over a similar time frame.
3. The protection platform layer (e.g., protection platform layer 120 of FIGS. 1 and 2) may then generate its own code page to inject into the container host OS.
4. Execution of the code contained on the page generated by the protection platform layer may determine the container application associated with the identified code page.

The code page generated by the protection platform layer may be configured to walk through the process directory of the container host OS to determine the container application associated with the code page being evaluated. Specifically, the code may walk through the process directory of the container host OS to determine the container application. For example, if a Linux container host OS is being utilized, the "/proc/self/cgroups" directory within the virtual CPU is parsed to determine the container application associated with the code page.

Once the application associated with the code page is identified, remediation steps are taken in operation 330. The remediation steps may include one or more of the following example operations:

Logging data identifying the offending application (e.g., both the container application and the specific image executing via the container host OS).

Building and storing additional metadata to be used for further forensics. This metadata may be stored in one or more of an ingested database (like ingested database 125 of FIGS. 1 and 2) or a trust data database (like trust data database 130 of FIGS. 1 and 2)

Informing container management/orchestration layers of the container identified in operation 325. This notification may take place by communicating the unique identifier (UID) associated with the container.

Surgically remediating the application identified in operation 325.

The remediation described above is considered "surgical" because it allows the offending application to be remediated (e.g., monitored, stopped or killed) while leaving the parent hierarchy of the container host OS and the container daemon unscathed and operational.

As with the identification of the application associated with the offending code that takes place in operation 325, the remediation of operation 330 may be effectuated through the creation of code pages that are injected into the container host OS by, for example, a protection platform layer such as protection platform layer 120 of FIGS. 1 and 2. As previously discussed above, the identification steps of operation 325 and remediation steps of 330 may also be carried out by a protection agent API executing within the container host OS, such as protection agent 122 of FIGS. 1 and 2. This remediation may also be carried out by identifying the application using its UID to the container daemon.

Figure 4:
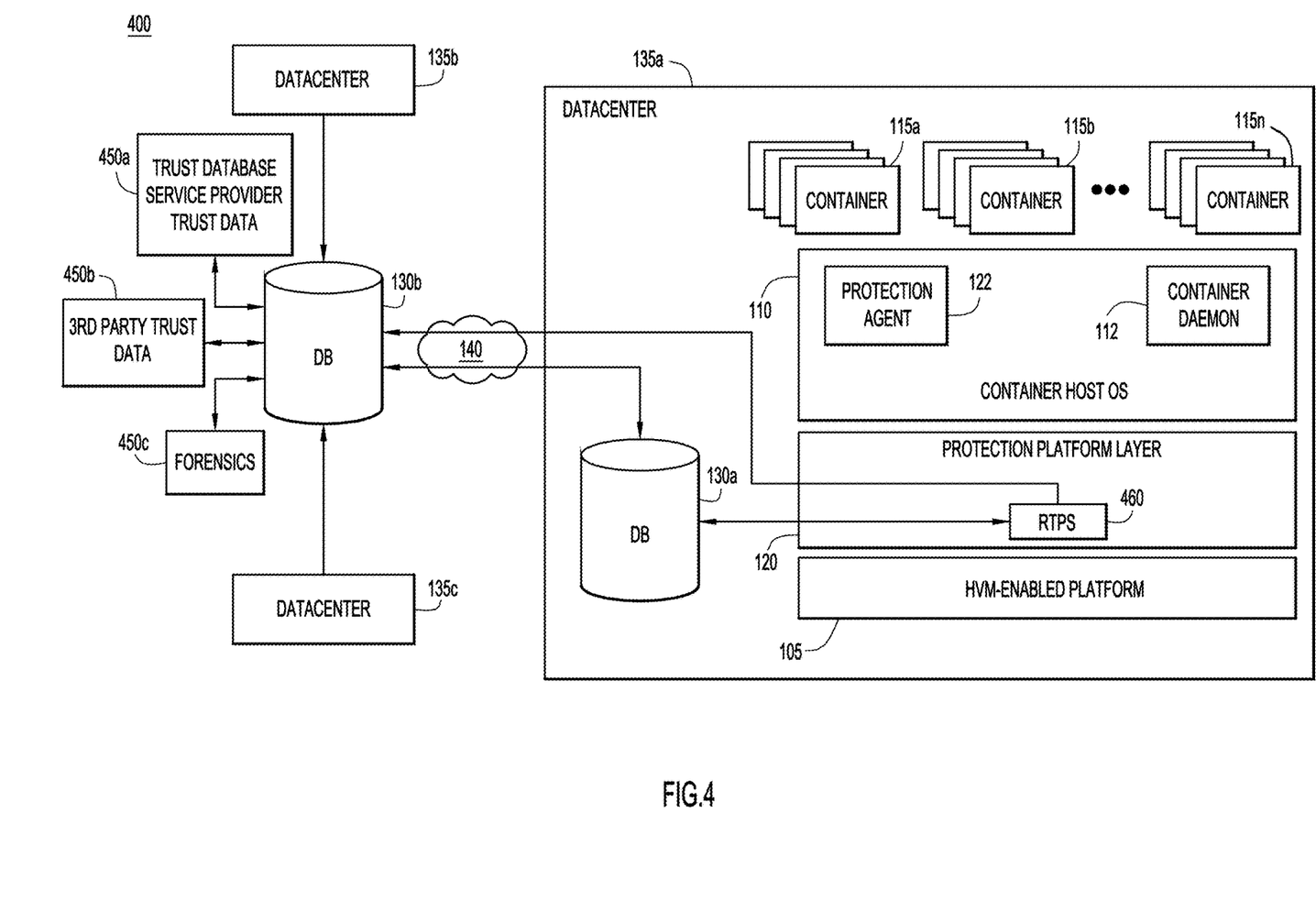
FIG. 4 is a block diagram illustrating a container application hosting environment that incorporates local and remote trust data databases, according to an example embodiment.

With reference now made to FIG. 4, depicted therein is an example embodiment of a trust data database system 400 configured to be utilized by protection platform layer 120. As illustrated in FIG. 4, trust data database system 400 includes both local trust data database 130a and a remote trust data database system 130b. Trust data database 130a is considered local because it is contained within datacenter 135a, while remote trust data database 130b is considered remote because the connection between remoted trust data database 130b to datacenter 135a is via net-work 140. More specifically, trust data database 130a may be considered a private trust data database because it is accessible by resources (e.g., protection platform layer 120) within datacenter 135a. Trust data database 130b may be considered a public trust data database because it may be accessed by a plurality of datacenters 135a-c.

Public trust data database 130b may be maintained by a service provider of trust data. For example, a service provider may generate trust data for a plurality of applications, both container and non-container applications. This trust data may then be accessible or distributed to one or more third parties associated with datacenters 135a-c. Trust data database 130b is populated from a plurality of sources 450a-c. These sources may include service provider trust data 450a, which is trust data generated by the service provider maintaining trust data database 130b, third party trust data 450b, which is trust data provided by the third parties associated with datacenters 135a-c, and forensics trust data 450c. Forensics trust data 450c may include trust data determined from protection platform layer systems, such as protection platform layer systems 120.

Trust data 450c may be particularly useful as it may be populated by protection platform layer systems 120 from multiple third parties. For example, as protection platform layer 120 provides security to container host OS 110, it may feedback all of the information it receives from its code-page level inspection to trust data database 130b. This information may include new code page fingerprints and associations therewith to applications, thereby enhancing the ability to positively identify applications associated with the identified code pages. Furthermore, because the information fed back to trust data database 130b is acquired with code page level granularity by protection platform layer 120, the information contained in trust data database 130b provides deep visibility into the applications' process flows, deeper visibility than what could be determined from only the signature of the application as a whole. Additionally, the trust scores provided by trust data database 130b may be more accurate as they may be calculated based on more information. Specifically, the trust scores within trust data database 130b may be based upon a larger number of evaluations, including the actual evaluation of the code pages contained in the applications as determined by the protection platforms layers 120 protecting actual container host OSs 110. In other words, because trust data database 130b receives information from protection platform layer 120, and may receive it from multiple protection platform layers, the data contained in trust data database 130b maybe more useful as it contains data acquired though an intimate relationship with actual container host platforms.

As also illustrated in FIG. 4, local trust data database 130a may be populated from remote trust data database 130b. For example, remote trust data database 130b may be configured as a cloud-based service for the third parties associated with datacenters 135a-c, respectively. The service may include subscriptions via which the local trust data database 130a is populated from the content of remote trust data database 130b. According to other example embodiments, protection platform layer 120 may directly access remote trust database 130b via network 140. In order to access trust data databases 130a and 130b, protection platform layer 120 may utilize a real time publish subscribe (RTPS) protocol 460. RTPS 460 permits protection platform layer 120 to receive the data from trust data databases 130a and 130b in real-time during the monitoring provided by protection platform layer 120.

Figure 5:
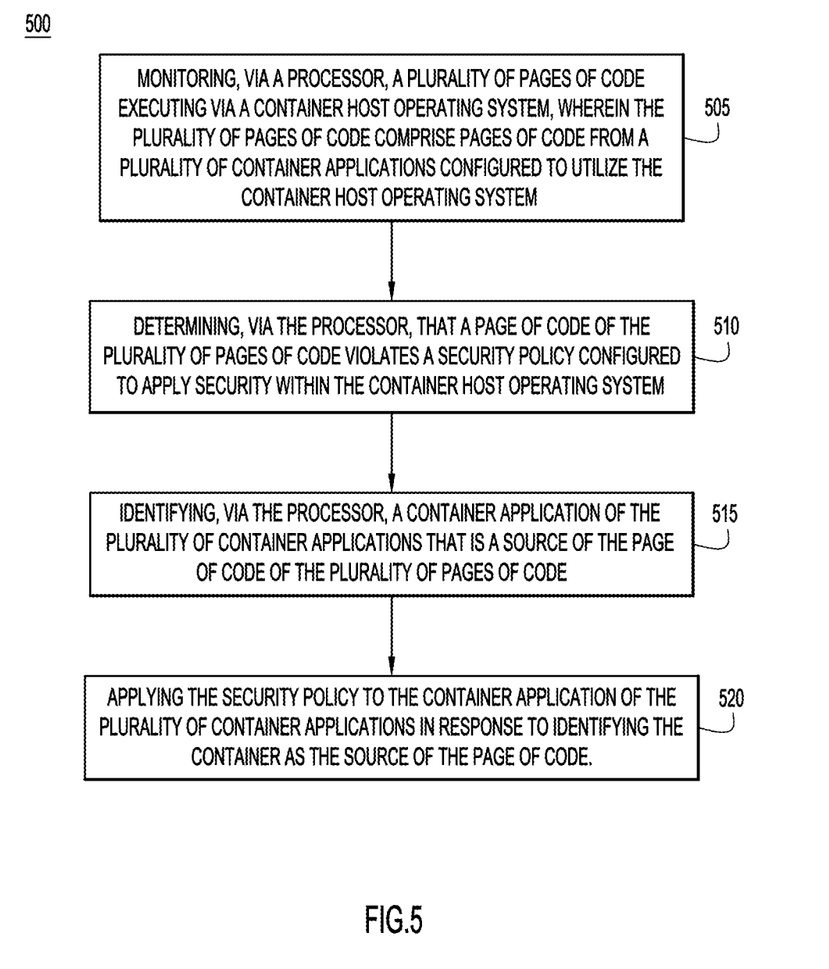
FIG. 5 is a flowchart illustrating a process for performing security in a container application hosting environment, according to an example embodiment.

With reference now made to FIG. 5, depicted therein is a flowchart 500 illustrating a process for carrying out the techniques described herein. The process begins in operation 505, in which monitoring of a plurality of pages of code is performed. This monitoring is of pages of code executing via a container host operating system, and the plurality of pages of code are from a plurality of container applications configured to utilize the container host operating system. The monitoring may also include the monitoring of pages of code associated with non-container applications, including pages of code associated with the container host operating system. An example of this monitoring would be the monitoring provided by a protection platform layer as described above with reference to FIGS. 1-3. More specifically, the monitoring may take place via a processor executing code associated with a protection platform layer.

In operation 510 it is determined that a page of code the plurality of pages of code violates a policy configured to apply security within the container host platform. For example, the monitoring of operation 505 may determine that the code from the page of code does not correspond to any of the entries contained in a trust data database, such as the trust data databases 130, 130a and 130b described above with reference to FIGS. 1-4.

In operation 515, the container application is identified as a source of the page of code. The identification of operation 515 may be performed according to the techniques described above with reference to FIGS. 1-4, and in particular as described above with reference to operation 325 of FIG. 3.

Finally, in operation 520, the security policy is applied to the container application in response to identifying the container application as the source of the page of code. For example, the application of the security policy may include killing the container application, or permitting the container application to execute with monitoring. The application of the security policy may be carried out by, for example, the operations described generally with reference to FIGS. 1 and 2, or more specifically, as described above with reference to operation 330 of FIG. 3.

The discussion above with regard to flowchart 500 focuses on the application of security policies to code pages associated with container applications. The techniques described herein may also be applied to other code pages, and even the code pages associated with the container host OS. For example, because the protection platform layer executes outside of the container host OS, as the container host OS begins executing, the protection layer platform may monitor the code pages associated with the container host OS itself. The protection platform layer may also monitor and apply security to code pages associated with applications other than container applications. Such application may be more easily identified by the PID, and security policies may be applied to such applications based upon the PID. Accordingly, in some example embodiments, non-container applications may be identified through a more simplified process than the identification process of operation 515 of flowchart 500.

Figure 6:
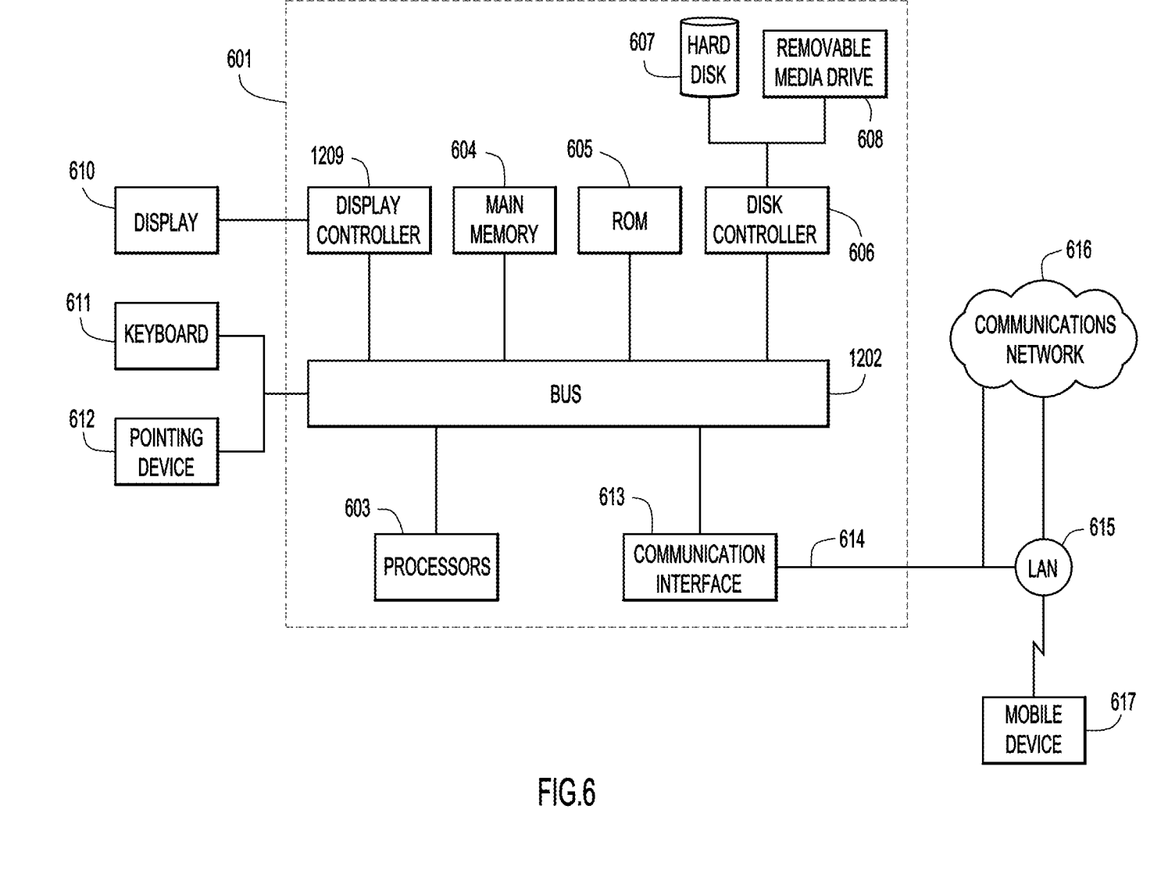
FIG. 6 is block diagram a of a network device configured to provide security in a container application hosting environment, according to an example embodiment.

With reference now made to FIG. 6, illustrated therein is a computer system 601 upon which the embodiments presented may be implemented. The computer system 601 may be programmed to implement a computer based device, and may be, for example, configured to execute an HVM-enabled platform as described above. The computer system 601 includes a bus 602 or other communication mechanism for communicating information, and a processor 603 coupled with the bus 602 for processing the information. While the figure shows a signal block 603 for a processor, it should be understood that the processors 603 represent a plurality of processing cores, each of which can perform separate processing. The computer system 601 also includes a main memory 604, such as a random access memory (RAM) or other dynamic storage device (e.g., dynamic RAM (DRAM), static RAM (SRAM), and synchronous DRAM (SD RAM)), coupled to the bus 602 for storing information and instructions to be executed by processor 603. In addition, the main memory 604 may be used for storing temporary variables or other intermediate information during the execution of instructions by the processor 603.

The computer system 601 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 also includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 601 may also include a display controller 609 coupled to the bus 602 to control a display 610, such as a cathode ray tube (CRT), liquid crystal display (LCD), light emitting diode (LED) display, or any other display technology now known or hereinafter developed, for displaying information to a computer user. The computer system 601 includes input devices, such as a keyboard 611 and a pointing device 612, for interacting with a computer user and providing information to the processor 603. The pointing device 612, for example, may be a mouse, a trackball, or a pointing stick for communicating direction information and command selections to the processor 603 and for controlling cursor movement on the display 610. In addition, a printer may provide printed listings of data stored and/or generated by the computer system 601.

The computer system 601 performs a portion or all of the processing steps of the processes described herein in response to the processor 603 executing one or more sequences of one or more instructions contained in a memory, such as the main memory 604. Such instructions may be read into the main memory 604 from another computer readable medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 601, for driving a device or devices for implementing the process, and for enabling the computer system 601 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 601 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a wired or wireless network interface card to attach to any packet switched (wired or wireless) LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local are network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the computer system 601 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 601 can transmit and receive data, including program code, through the network(s) 615 and 616, the network link 614 and the communication interface 613. Moreover, the network link 614 may provide a connection through a LAN 615 to a mobile device 617 such as a personal digital assistant (PDA) laptop computer, or cellular telephone.

In summary, provide for herein are container protection schemes for container platforms of all sizes. The techniques described herein protect container applications as well as container platforms, while also building databases for both predictive and forensic use about the container applications encountered by the protection systems.

Example embodiments of the techniques described herein may take the form of methods in which a plurality of pages of code executing via a container host platform are monitored via one or more processors. The plurality of pages of code may comprise pages of code from a plurality of container applications configured to utilize the container host platform. The methods may further include determining, via the one or more processors, that a page of code of the plurality of pages of code violates a security policy configured to apply security within the container host platform. The methods may also identify, via the one or more processors, a container application of the plurality of container applications that is a source of the page of code of the plurality of pages of code. Further operations of the methods may include applying the security policy to the container application of the plurality of container applications in response to identifying the container application of the plurality of container applications as the source of the page of code.

Other example embodiments of the techniques described herein may take the form of an apparatus comprising one or more processors configured to execute a plurality of pages of code via a container host platform, wherein the plurality of pages of code comprise pages of code from a plurality of container applications configured to utilize the container host platform. At least one of the one or more processors may be configured to monitor the plurality of pages of code executing via the container host platform. The at least one processor may be configured to determine that a page of code of the plurality of pages of code violates a security policy configured to apply security within the container host platform. The at least one processor may also be configured to identify a container application of the plurality of container applications that is a source of the page of code of the plurality of pages of code. Finally, the at least one processor may be configured to apply the security policy to the container application of the plurality of container applications in response to identifying the container application as the source of the page of code.

In addition to methods and apparatuses, example embodiments may also take the form of computer readable media encoded with instructions. The media may be tangible and/or non-transitory. The instructions, when executed, may be operable to monitor, via one or more processors, a plurality of pages of code executing via a container host platform, wherein the plurality of pages of code comprise pages of code from a plurality of container applications configured to utilize the container host platform. The instructions may be further operable, when executed, to determine, via the one or more processors, that a page of code of the plurality of pages of code violates a security policy configured to apply security within the container host platform. The instructions may also be operable to identify, via the one or more processors, a container application of the plurality of container applications that is a source of the page of code of the plurality of pages of code. Finally, the instructions may be operable to apply the security policy to the container application of the plurality of container applications in response to identifying the container application of the plurality of container applications as the source of the page of code.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    executing, via one or more processors, a container host operating system of a container host platform;
    monitoring, by the one or more processors from outside the container host operating system, a plurality of pages of code executing via the container host operating system in a plurality of user spaces, wherein each of the plurality of pages of code comprises a portion of code executable by the container host operating system, and wherein the plurality of pages of code comprise pages of code from a plurality of container applications configured to utilize the container host operating system;
    determining, by the one or more processors from outside the container host operating system, that a first page of code of the plurality of pages of code violates a security policy configured to apply security within the container host platform;
    identifying, by the one or more processors from outside the container host operating system, a container application of the plurality of container applications that is a source of the first page of code of the plurality of pages of code by querying a container daemon of the container host platform for a container identifier associated with the first page of code, wherein querying the container daemon of the container host platform comprises generating at least one second page of code to execute via the container host operating system to determine the container application; and
    applying the security policy to the container application of the plurality of container applications in response to identifying the container application of the plurality of container applications as the source of the first page of code.

2. The method of claim 1, wherein applying the security policy to the container application comprises determining a trust score for the container application.

3. The method of claim 2, wherein determining the trust score for the container application comprises receiving a trust score for the container application from a data store of trust ratings of container applications.

4. The method of claim 1, wherein determining that the first page of code of the plurality of pages of code violates the security policy comprises determining that the first page of code contains malicious code.

5. The method of claim 4, further comprising updating a trust score for the container application in a data store of trust ratings of container applications in response to the determining that the first page of code contains the malicious code.

6. The method claim 1, wherein applying the security policy to the container application comprises aborting execution of the container application via the container host operating system.

7. The method of claim 1, wherein the plurality of pages of code further comprise non-container application pages of code, and
    wherein the method further comprises:
        determining, by the one or more processors, that a third page of code of the plurality of pages of code violates a second security policy configured to apply security within the container host platform;
        identifying, by the one or more processors, a non-container application that is a source of the third page of code of the plurality of pages of code; and
        applying the security policy to the non-container application in response to identifying the non-container application as the source of the third page of code.

8. The method of claim 7, wherein the non-container application comprises the container host operating system.

9. The method of claim 7, wherein identifying the non-container application that is the source of the third page of code of the plurality of pages of code comprises identifying the non-container application from a process identifier associated with the third page of code.

10. The method of claim 1, wherein querying the container daemon of the container host platform comprises injecting the at least one second page of code into the container host operating system.

11. An apparatus comprising:
    one or more processors configured to execute a plurality of pages of code in a plurality of user spaces via a container host operating system of a container host platform, wherein each of the plurality of pages of code comprises a portion of code executable via the container host operating system, wherein the plurality of pages of code comprise pages of code from a plurality of container applications configured to utilize the container host operating system, and wherein at least one of the one or more processors is configured to:
        execute the container host operating system;

monitor, from outside the container host operating system, the plurality of pages of code executing via the container host operating system in the plurality of user spaces;
determine, from outside the container host operating system, that a first page of code of the plurality of pages of code violates a security policy configured to apply security within the container host platform;
identify, from outside the container host operating system, a container application of the plurality of container applications that is a source of the first page of code of the plurality of pages of code by querying a container daemon of the container host platform for a container identifier associated with the first page of code by generating at least one second page of code to execute via the container host operating system to determine the container application; and
apply the security policy to the container application of the plurality of container applications in response to identifying the container application as the source of the first page of code.

12. The apparatus of claim 11, wherein the at least one of the one or more processors is configured to determine that the first page of code of the plurality of pages of code violates the security policy by determining that the first page of code contains malicious code.

13. The apparatus of claim 11, further comprising a network interface, and wherein the at least one of the one or more processors is configured to:
receive, via the network interface, a trust score for the container application from a data store of trust ratings of container applications;
determine that the trust score for the container application indicates that the security policy applies to the container application; and
apply the security policy to the container application in response to determining that the trust score for the container application indicates that the security policy applies to the container application.

14. The apparatus of claim 11, wherein the plurality of pages of code further comprise non-container application pages of code, and
wherein the at least one of the one or more processors is further configured to:
determine that a third page of code of the plurality of pages of code violates a second security policy configured to apply security within the container host platform;
identify a non-container application that is a source of the third page of code of the plurality of pages of code; and
apply the second security policy to the non-container application in response to identifying the non-container application as the source of the third page of code.

15. The apparatus of claim 11, wherein the at least one of the one or more processors is configured to inject the at least one second page of code into the container host operating system.

16. A tangible, non-transitory computer readable storage media encoded with instructions, wherein the instructions, when executed, are operable to:
execute, via one or more processors, a container host operating system of a container host platform;
monitor, by the one or more processors from outside the container host operating system, a plurality of pages of code executing via the container host operating system, wherein the plurality of pages of code comprise pages of code from a plurality of container applications configured to utilize the container host operating system, and wherein each of the plurality of pages of code comprises a portion of code executable via the container host operating system of the container host platform;
determine, by the one or more processors from outside the container host operating system, that a first page of code of the plurality of pages of code violates a security policy configured to apply security within the container host platform;
identify, by the one or more processors from outside the container host operating system, a container application of the plurality of container applications that is a source of the first page of code of the plurality of pages of code by querying a container daemon of the container host platform for a container identifier associated with the first page of code by generating at least one second page of code to execute via the container host operating system to determine the container application; and
apply the security policy to the container application of the plurality of container applications in response to identifying the container application of the plurality of container applications as the source of the first page of code.

17. The tangible, non-transitory computer readable storage media of claim 16, wherein the instructions are further operable to determine that the first page of code of the plurality of pages of code violates the security policy by determining that the first page of code contains malicious code.

18. The tangible, non-transitory computer readable storage media of claim 16, wherein the instructions are further operable to:
receive a trust score for the container application from a data store of trust ratings of container applications;
determine that the trust score for the container application indicates that the security policy applies to the container application; and
apply the security policy to the container application in response to determining that the trust score for the container application indicates that the security policy applies to the container application.

19. The tangible, non-transitory computer readable storage media of claim 16, wherein the plurality of pages of code further comprise non-container application pages of code, and
wherein the instructions are further operable to:
determine that a third page of code of the plurality of pages of code violates a second security policy configured to apply security within the container host platform;
identify a non-container application that is a source of the third page of code of the plurality of pages of code; and
apply the second security policy to the non-container application in response to identifying the non-container application as the source of the third page of code.

20. The tangible, non-transitory computer readable storage media of claim 16, wherein the instructions are further operable to inject the at least one second page of code into the container host operating system.

* * * * *

UNITED STATES PATENT AND TRADEMARK OFFICE
CERTIFICATE OF CORRECTION

PATENT NO. : 10,592,664 B2
APPLICATION NO. : 15/422625
DATED : March 17, 2020
INVENTOR(S) : William E. Jacobs et al.

Page 1 of 1

It is certified that error appears in the above-identified patent and that said Letters Patent is hereby corrected as shown below:

In the Claims

Claim 7, Column 16, Line 42, please replace "applying the security policy" with --applying the second security policy--

Signed and Sealed this
Seventh Day of July, 2020

Andrei Iancu
*Director of the United States Patent and Trademark Office*